Dec. 26, 1961 K. E. OLANDER 3,014,455
CLAW PIECES FOR MILKING MACHINES
Filed Oct. 22, 1959
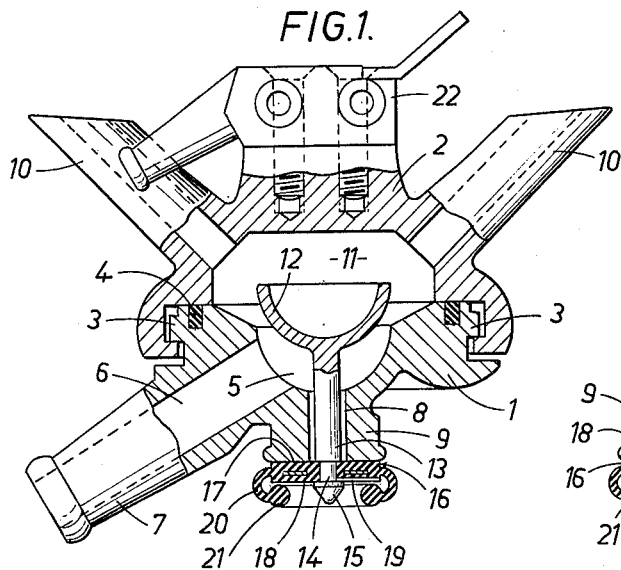
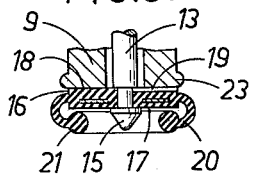
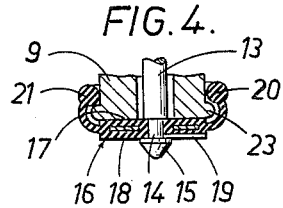
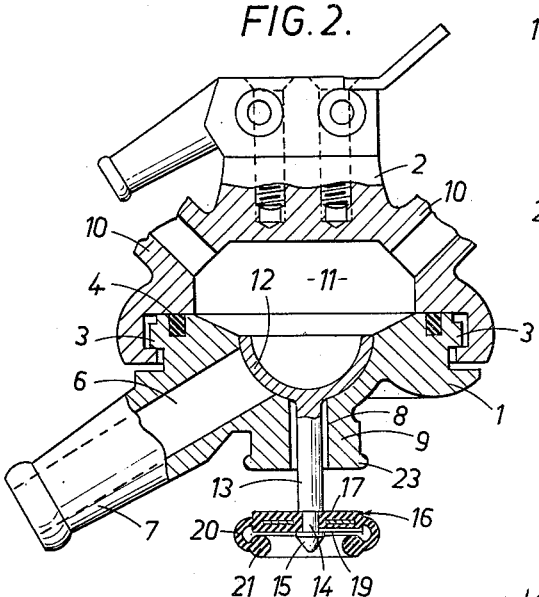
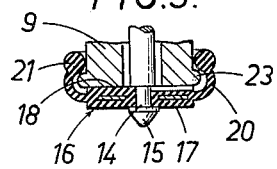
Inventor
Karl Erik Olander
by Sommers & Young
Attorneys United States Patent Office 3,014,455
Patented Dec. 26, 1961

3,014,455
CLAW PIECES FOR MILKING MACHINES
Karl Erik Olander, Lentorpsgatan 18,
Norrköping, Sweden
Filed Oct. 22, 1959, Ser. No. 848,018
7 Claims. (Cl. 119—14.54)

The present invention relates to milking machines and more particularly to the element, hereinafter referred to as "claw piece," which receives the milk from a cow undergoing milking, through four individual inlet tubes each connected to a separate one of the teat cups used and delivers it through a single outlet tube or other conduit under vacuum to the milk collecting vessel of a portable milking machine or to the milk conveying duct under vacuum belonging to a stationary, automatic milking plant including a plurality of milking machine sets.

During the normal operation of a milking machine including a claw piece the same degree of vacuum is prevailing inside the claw piece as in the outlet tube or conduit leading therefrom. Now, however, it may happen that in the course of milking operation the cow makes movements whereby a teat cup or cups or the whole teat cup unit may get loose from the respective teat or teats and drop to the ground. When this occurs atmospheric air will be allowed to enter the teat cup or cups dropped and pass through the associated flexible tubes into the claw piece and from there into the milk outlet conduit outgoing therefrom. It is already known to provide valve mechanisms in connection with claw pieces for automatically interrupting the communication between the interior of the claw piece and said outlet conduit upon the entrance of air of atmospheric pressure into the claw piece in order to stop the milking operation and prevent defiled milk from reaching the milk receiving vessel or milk conveying duct and to allow the milking operation to be taken up again after cleaning the teat cup unit and the claw piece and again bringing the interior of the claw piece into communication with the outlet conduit and the vacuum prevailing therein.

The hitherto used valve mechanisms for this purpose suffer from drawbacks either as regards construction or functions or both.

The primary object of the invention is to provide a claw piece having a valve mechanism settable for various functions which is simple in construction, highly efficient and reliable in use and which may be manufactured at low cost.

A further object of the invention is to provide a claw piece which may operate automatically for certain purposes and be manually set for other purposes.

Thus, a specific object of the invention is to provide a claw piece having a valve mechanism which in the normal milking operation may be maintained in open state under the action of the atmospheric pressure external of the claw piece, but allowed to immediately shift to closed state upon the entrance of air of atmospheric pressure into the claw piece as caused by the dropping of any of the teat cups in communication with the claw piece.

A further object of the invention is to provide a claw piece the valve mechanism of which may be manually set to a position in which it allows the entrance into the claw piece of a small amount of atmospheric air during the milking operation without the risk of the valve shifting to closed state.

A still further object of the invention is to provide a claw piece the valve mechanism of which may be locked in open state irrespective of the pressures prevailing externally and internally of the claw piece, with a view to allowing the claw piece to act as a portion of a conduit for passing a cleaning or disinfecting liquid through the claw piece and the associated teat cup unit while positively preventing leakage of liquid from the claw piece.

These and other objects of the invention will become apparent from the following detailed description of a preferred embodiment of the invention when considered in connection with the accompanying drawing, wherein:

FIG. 1 is an axial section of a claw piece according to the invention, with the valve shown in open state;

FIG. 2 is a similar section with the valve in closed state; and

FIGS. 3 to 5 are axial sections of a control member of the valve mechanism in different set positions.

The claw piece shown in FIGS. 1 and 2 of the drawing is shaped as a housing comprising a cup-like bottom member 1 and an arched cover member 2 resting by means of a plane annular bottom surface upon a plane annular top surface of the bottom member. The two members 1 and 2 may, for instance, be held together by means of a bayonet clutch the elements of which are formed integrally with the respective claw piece members, as indicated at 3, a tight sealing between the members 1 and 2 being secured by means of a packing ring 4 located in an annular groove formed in the plane contact surface of the bottom member 1.

The bottom member 1 is formed with a substantially semispherical recess 5. Outgoing from the side of said recess is an outlet passage 6 which extends through a sloping connecting branch 7, and outgoing from the lowermost point of the recess 5 is an axial boring 8 which extends through a sleeve-shaped projection 9 of the bottom member 1 which ends in a plane surface at right angles to the axis of boring 8.

The cover 2 is formed with four upwardly inclined connecting branches 10 representing four inlet passage opening into a space 11 inside the cover forming together with the recess 5 the milk collecting chamber of the claw piece.

The fur connecting branches 10 of the cover member 2 are adapted to be connected, as by means of flexible tubes, to the four teat cups of a teat cup unit, not shown, for receiving the milk from a cow undergoing milking. The connecting branch 7 of the bottom member 1 is adapted to be connected, as by means of a flexible tube, to the milk receiving can of a portable milking machine set or to the milk conveying duct of a stationary, automatic milking plant.

Located inside the milk collecting chamber of the claw piece is a cup-shaped valve body designed to closely fit in the preferably semi-spherical recess 5 of the bottom member 1. Said valve body is provided with a central stem 13 extending downwardly through the boring 8, the diameter of the stem being essentially less than that of the boring 8 so that there will exist a play between the stem and the wall of the boring, as clearly indicated in the drawing. The lower end of the stem projects beyond the end surface of the sleeve-shaped projection 9 by a rather large portion of its length when the valve body is in its lowermost position in engagement with the recess 5, as shown in FIG. 2. Near its end the stem 13 is formed with a reduced portion 14, the end of the stem below said reduced portion being conically tapered, as shown at 15, though, of course, this is not essential but only chosen by way of example.

Placed around said reduced portion 14 of stem 13 is a disc 16 of flexible material, such as natural or synthetical rubber. Both surfaces of disc 16 are flat to allow them to bear tightly against the plane end surface of projection 9. One of said surfaces, designated by 17, is flat all over its area, whereas the other surface, designated by 18, is formed with a groove 19 extending, preferably radially, between the periphery of the disc and the central boring of the disc for receiving the reduced portion 14 of stem 13.

The disc 16 is formed with a peripheral flange in the shape of a curved wall 20 ending in a ring 21 the diameter of which is larger than the thickness of the wall 20. Due to the flexibility of wall 20 the ring 21 may be shifted from one side of disc 16 to the other, as will be more clearly hereinafter explained.

Positioned on the top end of the cover 3 is a member 22 having a number of connecting branches outgoing therefrom for connection with a device for generating a pulsating vacuum. This detail, however, has nothing to do with the present invention and need therefore not be described in this connection.

The operation of the device shown is generally as follows:

When the claw piece described is coupled to a milking machine out of operation the valve body 12 is held in its lowermost position, in engagement with the recess 5, under the action of its own weight. In this position of the valve body the connection between the interior of the claw piece and the outlet passage 6 is held interrupted. This position is shown in FIG. 2. When it is desired to start milking after the respective teat cup unit is brought to its proper position and the interior of the connecting branch 7 is subjected to vacuum, the valve body is raised out of engagement with the recess 5 by lifting with a finger the disc 16 and the associated valve stem 13 until the disc comes to bear against the plane end surface of the projection 9. If in doing this the intact surface of disc 16 is facing the projection 9, atmospheric air is positively prevented from entering the interior of the claw piece via the free space of the boring 8 remaining around the valve stem 13. This position is shown in FIG. 1. As long as the milking operation is proceeding normally there exists a certain vacuum inside the claw piece of a sufficient value to allow the pressure of the atmospheric air acting on the exposed surface of disc 16 to hold said disc pressed against the plane end surface of member 4 so as thereby to maintain the valve body 12 in its lifted state even after the disc is released from the pressure of the finger.

Thus as long as the milking operation proceeds undisturbedly the milk will pass from the teat cups via the respective tubes and the connecting branches 10 to the claw piece and through the same, leaving it by way of the outlet passage 6 for further passing to the milk receiving vessel or duct, as the case may be. There is no risk for the through passing stream of milk to move the valve body to its closed state by impact against the valve body because of the great difference between the atmospheric pressure acting on the disc 16 and the vacuum existing inside the claw piece.

If in the course of milking the cow would make movements causing any test cup or the entire teat cup unit to drop to the ground, atmospheric air is allowed to enter the teat cup or cups thus dropped and reach the interior of the claw piece via the tubes connected to the connecting branches 10. As a result, the pressure acting on both sides of the valve controlling disc 16 will be equal, thereby allowing the valve to move to closed position under the action of its own weight, assisted by the impact on valve body as exerted by the stream or streams of air entering through the connecting branches 10 and the milk possibly carried by said streams.

Due to the rather large play existing between the valve stem 13 and the wall of the boring 8, any tendency of the valve towards assuming an oblique position due to such impacts is avoided.

Owing to the rapid closing of the inlet end of passage 6 thus resulting there will be no chance for the air to propagate into passage 6 and carry impurities into the milk delivered from the claw piece. In case of a portable milking machine set the milking operation may be continued immediately after necessary cleaning of the teat cups and the claw piece has taken place. In respect of a stationary, automatic milking plant the milking operation may proceed undisturbedly at the other teat cup units connected to the same milk conveying duct as the dropped one, while said dropped teat cup unit is taken away for cleaning and disinfecting purpose and then again brought into action after opening the valve of the respective claw piece.

In certain cases it may be desirable to allow a small quantity of atmospheric air to reach the interior of the claw piece via boring 8 during the milking operation for facilitating the delivery of the milk from the recess 5. To this end the disc 16 is removed from stem 13 and again placed thereunto after having been shifted so as to have its surface 18 with the radial groove 19 facing the end surface of projection 9, as shown in FIG. 3. In the open state of the valve body, that is to say, with said surface 18 bearing against the end surface of the projection 9, atmospheric air is allowed to enter recess 5 via groove 19 and boring 8.

In the cases of operation above described the flange 20 of disc 16 is held in its downwardly swung position, as shown in FIGS. 1 to 3, that is to say, with the ring 21 bearing against the lower exposed surface of disc 16.

For the purpose of cleaning or disinfecting the claw piece and the associated teat cup unit after a completed milking operation it is usual practice to pass a cleaning or disinfecting liquid through the teat cup and the claw piece or vice versa, in which cases the claw piece should act as a piece of a conduit, that is, with the valve body permanently in open state. In order to prevent cleaning or disinfecting liquid from leaking through passage 8, if the valve member would unintentionally be moved to closed state as well as to prevent the valve member from being unintentionally moved to closed state, the disc 16 may be locked to the projection 9 with its one surface or the other in contact with the end surface of said projection. This may be done by shifting the flange 20 of disc 16 from its lower position to upper position so that the ring 21 surrounds the projection 9. In order to secure the flange in this position the projection 9 may be formed with an annular bulb 23 at its lower end serving as a stop member for the ring 21. Since ring 21 airtightly engages the peripheral surface of the projection 9 it is no matter whether surface 18 or 19 bears against the end surface of projection 9, as shown in FIGS. 4 and 5.

It should be understood, of course, that the foregoing disclosure relates to only a preferred embodiment of the invention and that modifications or alterations may be made therein without departing from the spirit and the scope of the invention as set forth in the appended claims.

I claim:

1. In the claw for milking machines the combination with a housing having separate inlets for receiving milk from the teat cups of a vacuum driven milking machine, a single outlet for delivering the milk thus received to a conduit under vacuum, and having a boring through its bottom, of an automatic cut off valve comprising a stem extending with play through said boring so as to be freely movable up and down therein, an inner valve body supported by said stem inside the housing for interrupting the communication between the interior of the housing and said outlet in the lowermost position of the valve stem, an outer valve body supported by the end of the stem projecting beyond the bottom of the housing for interrupting the communication between the atmosphere and the interior of the housing through said boring in the uppermost position of the valve stem and maintaining the valve stem in this position under the action of the atmospheric pressure on said other valve body as long as a vacuum is prevailing inside the housing, the valve stem being such a length as to keep the inner valve body when in its raised state in the path of the flow of atmospheric air and milk forcibly entering through any of the teat cup inlets upon the dropping of the respective teat cup from a teat of a cow undergoing milking so as to allow said valve body to be moved to closed position under the combined action of the energy of movement of said flow of air and milk and the own weight of the valve.

2. In a claw for milking machines as claimed in claim 1, the further feature that the axial boring formed in the bottom member of the housing is larger diameter than the stem projecting therethrough in such a degree as to leave a free space between the stem and the wall of said boring with a view to allowing the stem to take up an oblique position in said boring without any risk of being jammed therein.

3. In a claw for milking machines as claimed in claim 1, the further feature that the valve body supported by the projecting end of the valve stem comprises a disc of flexible material tightly bearing against the under side of the bottom member of the housing around the lower mouth of the axial boring therethrough so as to act as a valve for cutting off communication between the atmosphere and the interior of the housing of the claw via said boring while maintaining the valve body in lifted state under the action of the atmospheric pressure as long as there is a vacuum prevailing inside the housing.

4. In a device as claimed in claim 2, the further feature that the flexible disc acting as valve controlling means is bounded axially by two plane parallel surfaces for cooperation with a plane surface formed on the bottom member of the housing around the lower end of the axial boring in said member for controlling the flow of atmospheric air through said boring into the recess of the bottom member of the housing as well as the leakage of fluid from said recess.

5. In a device as claimed in claim 4, the further feature that flexible disc acting as a valve controlling means is formed in one of its plane surfaces with an open groove for passing a small quantity of air from outside into the recess in the bottom member of the housing in the raised state of the valve body with said plane surface bearing against the plane surface of the bottom member surrounding the lower end of the axial boring of said member.

6. In a claw for milking machines as claimed in claim 1, and in which the axial boring for receiving the valve stem extends through a sleeve shaped projection of the bottom of the housing with the exposed end surface of said projection forming a seat for the flexible disc acting as a combined valve controlling member and air valve under the action of the atmospheric pressure, the further feature that said disc is formed with a peripheral flange having a thickened annular end portion and forming an arch-shaped connection between said end portion and the periphery of the disc for allowing the thickened end portion to assume a position against the exposed surface of the disc or a reverse position in contact with the circumferential surface of the sleeve shaped projection.

7. In a claw for milking machines as claimed in claim 1, the further feature that the inner valve body acting as cut off valve is cup-shaped so as to allow the flow of atmospheric air and milk forcibly entering through any of the milk inlets upon dropping of a teat cup to act more effectively and rapidly in imparting its energy of movement to the valve body, the bottom of the housing having a correspondingly cup-shaped recess acting as a seat for the valve body, into the side of which recess the milk outlet opens.

References Cited in the file of this patent

UNITED STATES PATENTS

| | | |
|---|---|---|
| 1,230,178 | Layng | June 19, 1917 |
| 2,228,936 | Walter | Jan. 14, 1941 |
| 2,507,969 | Gascoigne | May 16, 1950 |
| 2,610,609 | Thomas | Sept. 16, 1952 |
| 2,694,380 | Harstick | Nov. 16, 1954 |
| 2,727,491 | Reeve | Dec. 20, 1955 |